United States Patent [19]

Takano et al.

[11] Patent Number: 5,850,254
[45] Date of Patent: Dec. 15, 1998

[54] IMAGING SYSTEM FOR A VEHICLE WHICH COMPARES A REFERENCE IMAGE WHICH INCLUDES A MARK WHICH IS FIXED TO SAID VEHICLE TO SUBSEQUENT IMAGES

[75] Inventors: Kazuaki Takano, Mito; Tatsuhiko Monzi, Hitachinaka; Yasunari Tanaka, Mito; Eiryoh Ondoh, Hitachinaka; Makoto Shioya, Tokyo, all of Japan

[73] Assignee: Hitachi, Ltd., Tokyo, Japan

[21] Appl. No.: 456,394

[22] Filed: Jun. 1, 1995

[30] Foreign Application Priority Data

Jul. 5, 1994 [JP] Japan .................................. 6-153288

[51] Int. Cl.$^6$ ........................... H04N 7/18; H04N 5/225; H04N 5/228; H04N 7/00
[52] U.S. Cl. ......................... 348/148; 348/208; 348/169; 348/118; 348/135; 348/142; 340/903; 340/937; 340/435; 340/436; 382/103; 382/104; 180/167
[58] Field of Search ...................................... 348/135, 136, 348/137, 140, 148, 149, 142, 118, 119, 143, 175, 176, 178, 179, 190, 208, 211; 340/903, 937, 435, 436; 180/167, 169, 270; 250/491.1; 382/103, 104

[56] References Cited

U.S. PATENT DOCUMENTS

| 3,882,268 | 5/1975 | Ogawa et al. . | |
|---|---|---|---|
| 5,070,454 | 12/1991 | Griffith | 364/413.13 |
| 5,294,991 | 3/1994 | Oshima et al. | 348/208 |
| 5,333,111 | 6/1994 | Chaiken et al. | 364/470 |
| 5,355,118 | 10/1994 | Fukuhara | 340/435 |
| 5,521,843 | 5/1996 | Hashima et al. | 364/516 |
| 5,523,811 | 6/1996 | Wada et al. | 354/76 |
| 5,530,771 | 6/1996 | Meakawa | 382/103 |
| 5,555,555 | 9/1996 | Sato et al. | 382/104 |
| 5,568,190 | 10/1996 | Noguchi et al. | 348/208 |
| 5,596,365 | 1/1997 | Erickson et al. | 348/208 |
| 5,627,586 | 5/1997 | Yamasaki | 348/169 |
| 5,638,116 | 6/1997 | Shimoura et al. | 348/118 |

FOREIGN PATENT DOCUMENTS

| 0 132 151 A1 | 1/1985 | European Pat. Off. . |
| 1 281600 | 11/1989 | Japan . |
| 3 97080 | 4/1991 | Japan . |
| 3 203000 | 9/1991 | Japan . |
| 5 62099 | 3/1993 | Japan . |

OTHER PUBLICATIONS

Harville Hedrix, Old Brain Logic, Getting The Love You Want, pp. 10–11, 1988.
Proceedings of the 1992 IEEE/RSJ International Conference on Intelligent Robot and Systems, vol. 3, Jul. 7, 1992, USA, pp. 2195–2202 by H. Ishiguro, et al. Active Vision by Multiple Visual Agents.

*Primary Examiner*—Tommy P. Chin
*Assistant Examiner*—David R Vincent
*Attorney, Agent, or Firm*—Antonelli, Terry, Stout, & Kraus, LLP

[57] ABSTRACT

An environment recognition device formed in such a manner that an image sensor is installed so that an image sensor mounting location recognition mark falls within an image pickup area, comparator for comparing mark locations the images of which are picked up sequentially by the image sensor with respect to the initial location of the recognition mark in the image pickup area is provided, and, when it is detected that the mark location recognized sequentially has changed with respect to the initial location, an indication signal for indicating that correction of the location of installing the image sensor is required is outputted, thereby to prevent erroneous decision in image processing when the mounting position changes by vibration, contact or the like.

25 Claims, 14 Drawing Sheets

F I G. 4
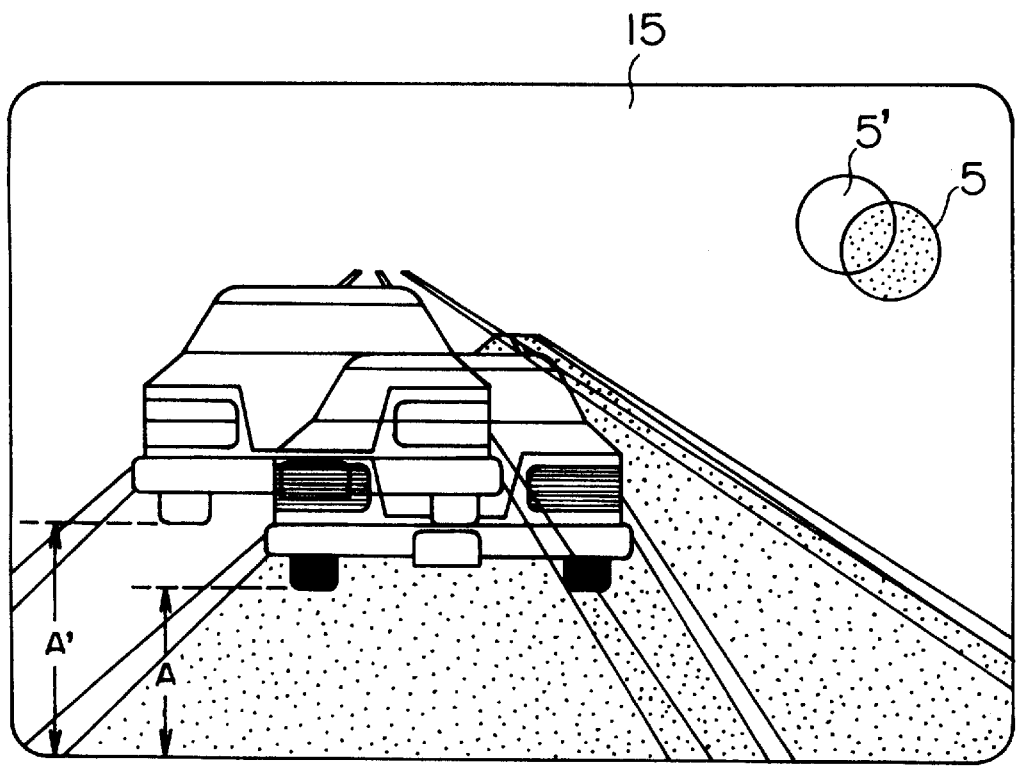

F I G. 10
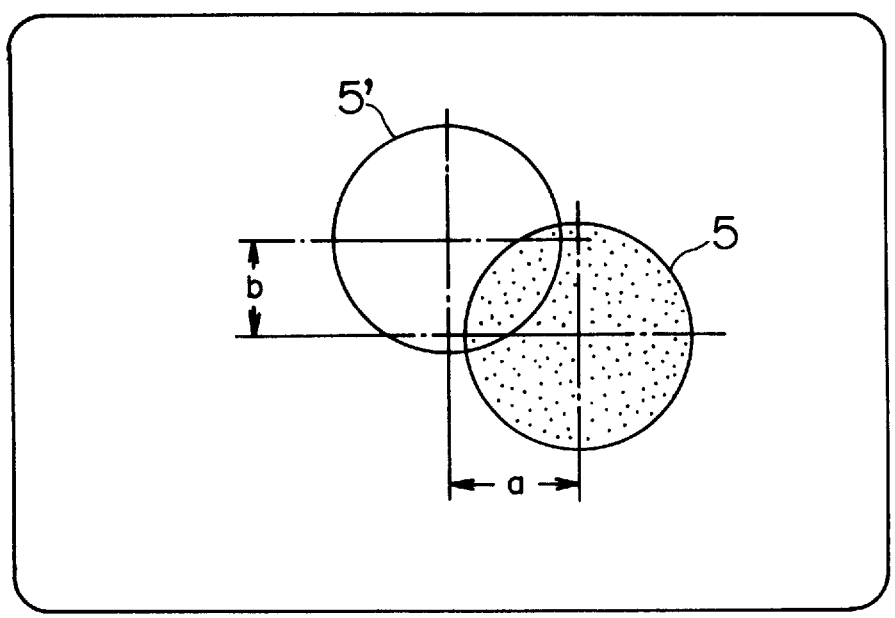

F I G. 11
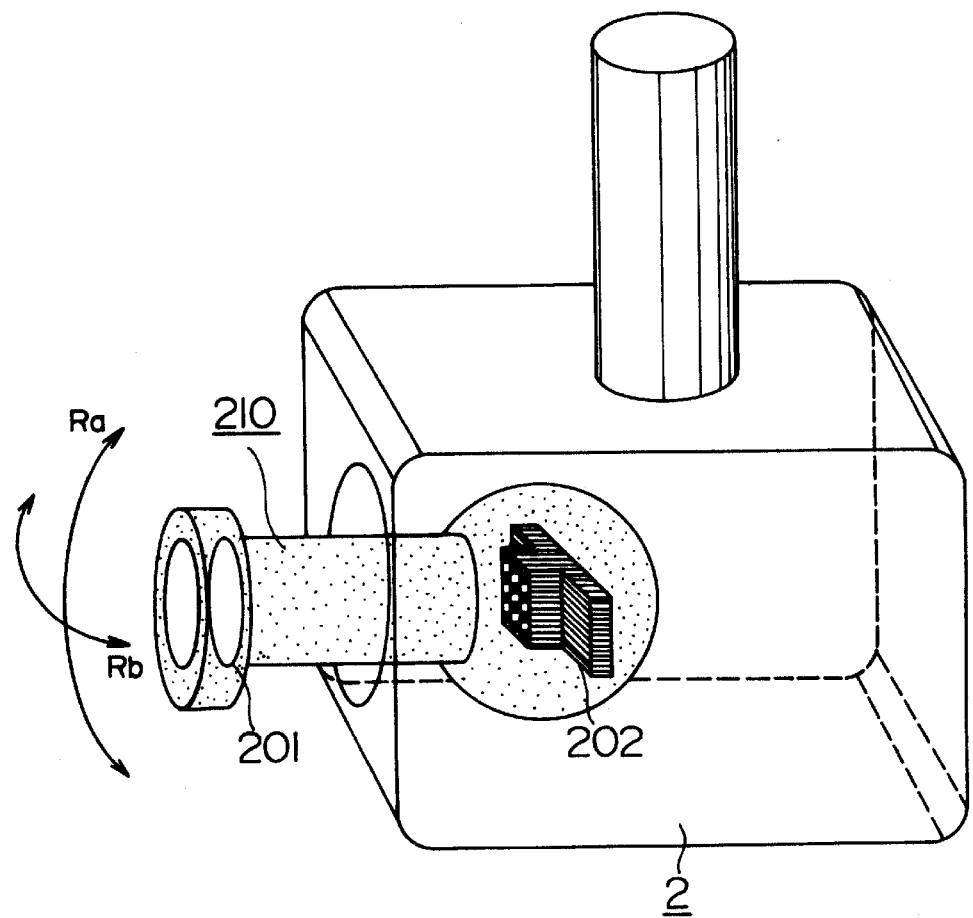

IMAGING SYSTEM FOR A VEHICLE WHICH COMPARES A REFERENCE IMAGE WHICH INCLUDES A MARK WHICH IS FIXED TO SAID VEHICLE TO SUBSEQUENT IMAGES

BACKGROUND OF THE INVENTION

The present invention relates to an environment recognition device using an image pickup device, and to a device and a method for recognizing an environment around a vehicle used in an on-vehicle device for recognizing an external environment of a vehicle for supporting safe driving of a vehicle for instance and, to be concrete, using an image sensor such as a CCD camera as the image pickup device.

Conventional environment recognition devices include, for example, one that is disclosed in JP-A-3-203000 that performs environment recognition using an image pickup device such as a CCD camera installed in a vehicle as an image sensor for the purpose of supporting safety driving of the vehicle. Further, as disclosed in JP-A-1-281600, a device for deciding whether there is a preceding vehicle within a safe distance or not based on image data of an image pickup device is also proposed. Since the picked up image data are different depending on the mounting location and the set angle of the image sensor in the environment recognition device using the image pickup device described above, univocal relative relationship between image data and recognition object information such as the distance between vehicles is adjusted after the image sensor is mounted and fixed. Or, the mounting location and the set angle of the image pickup device are adjusted so that the preset relative relationship between image data and the recognition object information may be obtained.

In the conventional environment recognition device described above, however, compensation for the change with the passage of time of the mounting location and set angle of the image sensor has not been taken into consideration. As a result, there has been such a possibility that, even when the mounting location and the set angle of the image pickup device change with respect to the initialized location by vibration, contact or the like, an image processing means forms erroneous judgement based on inappropriate information of the image pickup device without noticing the change.

A device in which a point is provided at a principal position on the road in a detection area is set based on the position of this point in order to correct deviation of the detection area of a laser device as a vehicle detection device installed on the road has been disclosed in JP-A-5-62099. Further, a monitor for deciding the magnitude of the portion where brightness exceeds a critical value by comparing image information inputted from an image sensor with reference image data, thereby to distinguish between the existence of an invader and deviation of the mounting location of the image pickup device by vibration or the like has been disclosed in JP-A-3-97080. In these prior arts, however, nothing has been described on the detection of deviation of the mounting location of an image sensor (an image pickup device), and further, the effects of the invention are influenced largely depending on what is the point of the former gazette and on what will be taken as the reference image data in the latter gazette. Therefore, appropriate setting of the point and the reference image data has been difficult.

SUMMARY OF THE INVENTION

It is an object of the present invention to prevent erroneous decision based on inappropriate information from an image pickup device when the mounting location of an image pickup device has changed with the passage of time due to vibration, contact or the like with respect to an initialized location.

The present invention has been described with an environment recognition device of a vehicle as an example, but it can also be applied for preventing erroneous recognition due to deviation of a mounting location of an image pickup device when the environment is recognized from image pickup data in a general environment recognition device.

In an environment recognition device of the present invention, an image pickup device is installed so that a recognition mark for specifying the initial mounting location of an image pickup device falls within an image pickup area in order to achieve the above-mentioned object. To be concrete, there is provided means for detecting and comparing location data of practical marks the images of which are picked up sequentially by the image pickup device with respect to the initial location data of the recognition mark in the image pickup area.

Further, a mark showing a mounting location of an image pickup device is set up in a vehicle mounted with the image pickup device. The location data of the mark are inputted to a processing unit as one of peripheral information.

In a method of recognizing an environment from image data according to the present invention, the data showing the mounting location of an image pickup device are used as one of image processing data.

In an environment recognition device of the present invention, a mark for specifying a mounting location of an image pickup device is set up in a portion that becomes within the image pickup area of the image sensor, and there are provided a memory portion for storing an initialized location of this mark and means for detecting and comparing the mark locations thereafter one after another in the image processing device. Further, when the sequentially recognized mark location has changed with respect to the initialized location, it is informed by an alarm or the like that the set location of the image sensor is inappropriate and requires correction, or the posture of the image sensor is corrected automatically or the image data are corrected.

Besides, in the present invention, the word "environment" is used in a broad sense, and indicates all the objects that can be viewed as images. In the embodiment, it is a landscape around the vehicle, but it may be a work along a production line, cloths, or an indoor landscape in other examples.

BRIEF DESCRIPTION OF THE DRAWINGS

FIG. 4 is an image window showing the operation of the embodiment;

FIG. 10 is an image window for explaining the operation of the above-mentioned embodiment;

FIG. 11 is a schematic perspective view showing still another embodiment of the present invention;

DESCRIPTION OF THE PREFERRED EMBODIMENTS

Figure 1:
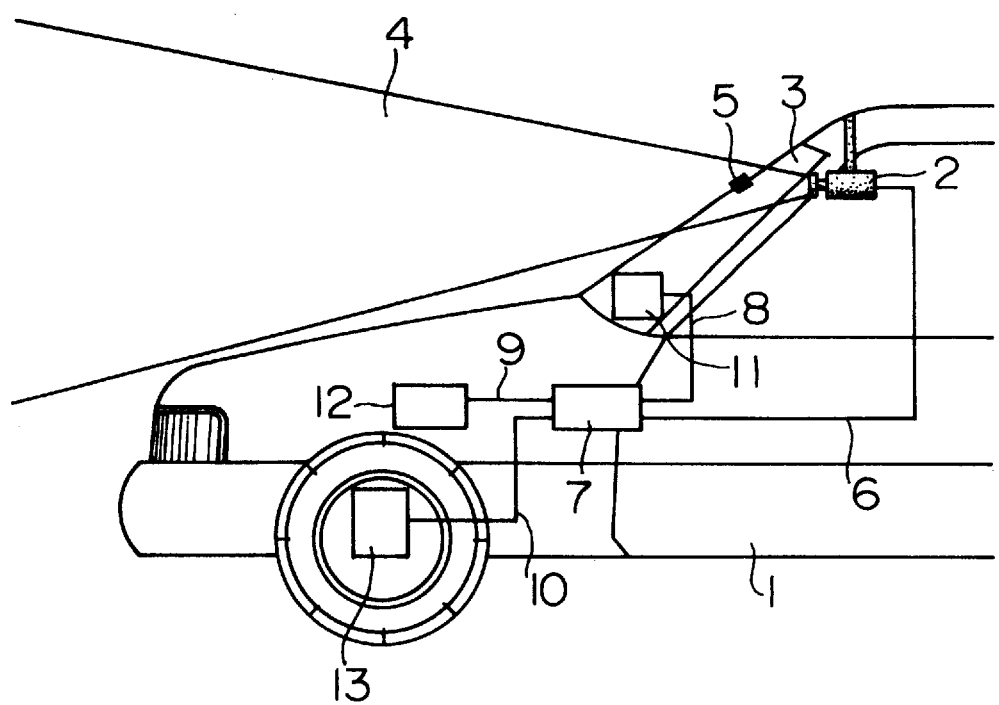
FIG. 1 is a schematic side view showing a rough structure of a first embodiment of the present invention.

Embodiments of the present invention will be described hereinafter with reference to the drawings. At the beginning, a general structure of an environment recognition device for a vehicle that is an embodiment of the present invention will be shown with reference to FIG. 1. An image sensor 2 for picking up an image of an environment outside a vehicle is installed on its own vehicle 1. Further, a mark 5 is stuck on a windshield 3 so that the location thereof falls within an image pickup area 4 of the image sensor 2. Further, the image sensor 2 is connected to an image signal processing unit 7 by an image signal line 6, and the image signal processing unit 7 is also connected to a warning device 11, a brake control unit 12 and a steering control unit 13 through an alarm signal line 8, a brake control signal line 9 and a steering control signal line 10, respectively.

Figure 2:
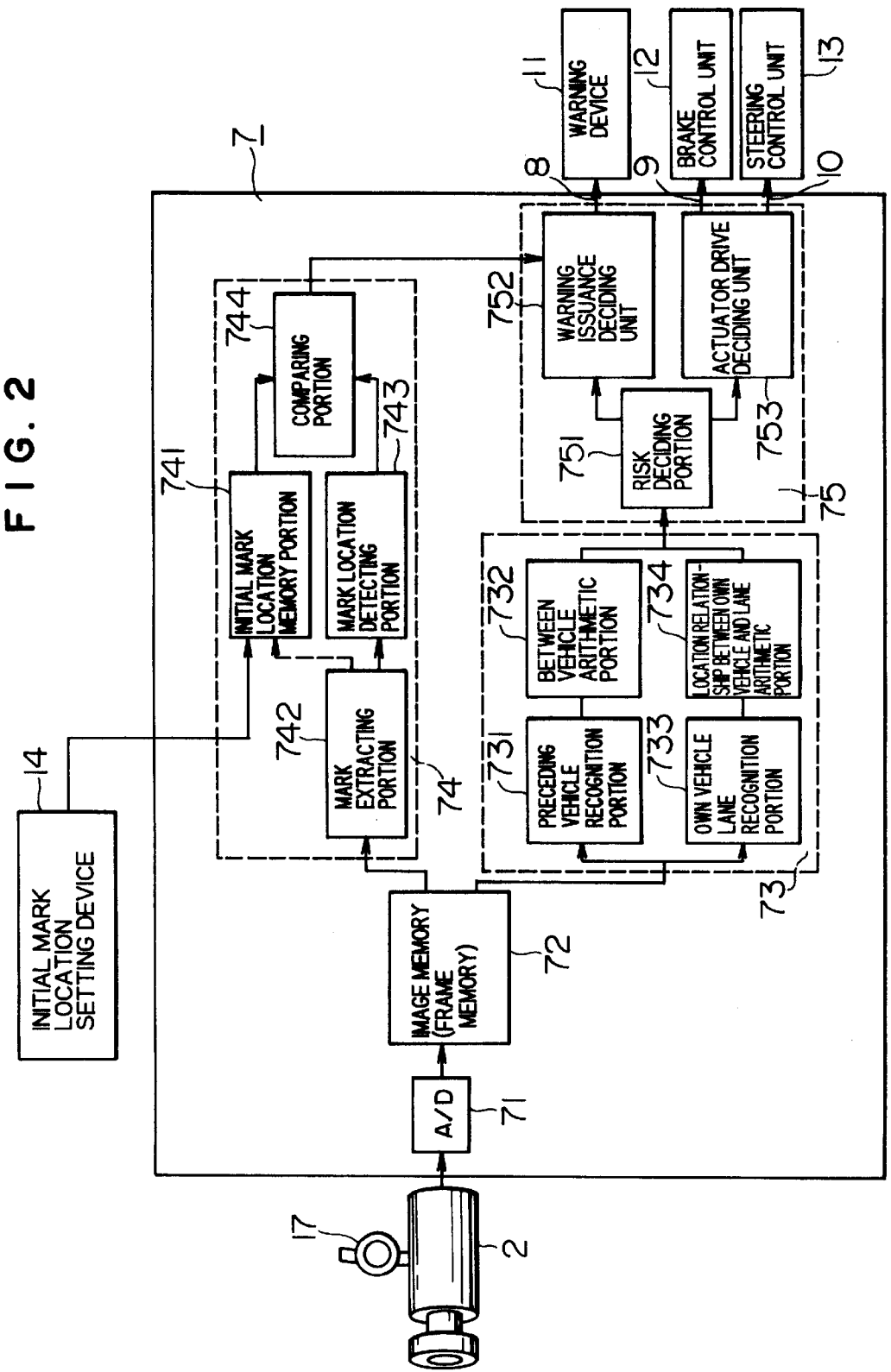
FIG. 2 is a block diagram showing a structure of a signal processing portion in the first embodiment.

FIG. 2 shows an internal structure of the image processing device 7, but it is divided roughly into five portions, i.e., an A/D converter 71 for converting an analog signal from the image sensor 2 into a digital signal, an image memory 72 for taking in image data in a pixel unit, an image processing portion 73 for recognizing and computing a relative location of its own vehicle to the external environment, an image sensor location change deciding portion 74 for detecting and deciding location deviation of the image sensor with respect to the initialized location, and a danger avoidance deciding portion 75 for deciding control of issuance of warning, brake and steering. The image processing portion 73 is composed of a preceding vehicle recognition portion 731, a distance between vehicles arithmetic portion 732, an own vehicle lane recognition portion 733 and a location relationship between own vehicle and lane arithmetic portion 734. The image sensor location change deciding portion 74 is composed of an initial mark location storage portion 741 connected to an initial mark location setting device 14, a mark extracting portion 742, a mark location detecting portion 743 and a comparator 744. The danger avoidance deciding portion 75 is composed of a risk deciding portion 751, a warning issuance deciding unit 752 and an actuator drive deciding unit 753.

Next, the operation of the present embodiment will be described with reference to FIG. 2 to FIG. 4. In FIG. 2, the image data in front of its own vehicle picked up by the image sensor 2 are converted into 8-bit digital data for instance by means of the A/D converter 71 and stored in the image memory 72. Recognition of a preceding vehicle (731) and computation of the distance from the preceding vehicle (732) are performed in the image processing portion based on these data. Further, recognition of its own vehicle lane (733) and computation of location relationship between its own vehicle and the lane (734) are performed in parallel therewith. Abnormal approach to a preceding vehicle, lane jutting out running and so on are decided in the risk deciding portion 751 based on these results of computation, and when it is decided that collision can be avoided by informing a driver of the fact with warning, a warning for attracting a driver's attention to the collision avoidance operation is given from the warning device 11 by the decision of the warning issuance deciding unit 752. On the other hand, when it is decided in the risk deciding portion 751 that collision is unavoidable by warning only, brake control (12) and/or steering control (13) is performed by the decision of the actuator drive deciding unit 753, thereby to perform collision avoidance on the car side without operation by the driver.

The foregoing shows general operation of the collision avoidance unit, but a characteristic portion of the present embodiment will be described with reference to FIG. 2 to FIG. 4 in the next place. When initialization of the image sensor is completed, the initial mark location setting device 14 is operated (1001) so as to store the location of the mark 5 in the initial mark location storage portion 741 in the image sensor location change deciding portion 74 (1002). At this time, a reloadable ROM or a RAM having a backup power supply is used in the initial mark location storage portion 741 so that the memory of the initial mark location does not disappear even when turning on electricity to the image signal processing unit is suspended because of the reason that a battery cable is disconnected and so on.

When setting of the initial mark location is completed, the following operation is performed thereafter in parallel with the normal collision avoidance operation described above. Namely, the location of the mark 5 during running is detected from the image data taken into the image memory 72 through the mark extracting portion 742 and the mark location detecting portion 743 (1003). Next, in the comparator 744, the location is compared with the data stored in the initial mark location storage portion 741 (1004). Here, when the mark location detected sequentially is equal to the initial mark location (1005), it is decided that the location of the image sensor has not been changed, processings described above in the image processing portion 73 and the danger avoidance deciding portion 75 are performed (1006 and 1007), and the process is returned to the operation of taking in the image of the next frame.

On the other hand, when two mark locations are different from each other as shown at 5 (an initial position) and 5' (a detected location during running) in the image window 15 shown in FIG. 4 in the processing (1005) in the comparator 744, it is decided that the image sensor has changed with respect to the initialized location (1008), and a warning is given to the driver through the warning issuance deciding unit 752 and the warning device 11 (1009). At this time, the warning is given to the driver while changing the tone color or the like so as not to confuse with the collision avoidance warning such as preceding vehicle abnormal approach and car lane jutting out. Further, transmission of an image signal from the image memory 72 to the image processing portion 73 is stopped, and the danger avoidance deciding function is suspended until the image sensor location is readjusted to the initial location.

According to the present embodiment, it is possible to always monitor the location change of the image sensor by extracting the mark location out of image data taken in sequentially and comparing this mark location with the initial location. As a result, it is possible to prevent such a problem that an erroneous distance between vehicles is computed using a distance A' in an image window in a state that the image sensor is deviated, thus giving inappropriate risk decision when risk decision is ought to be made originally by computing the distance from a preceding vehicle using a distance A in the image window as shown in FIG. 4.

Figure 5:
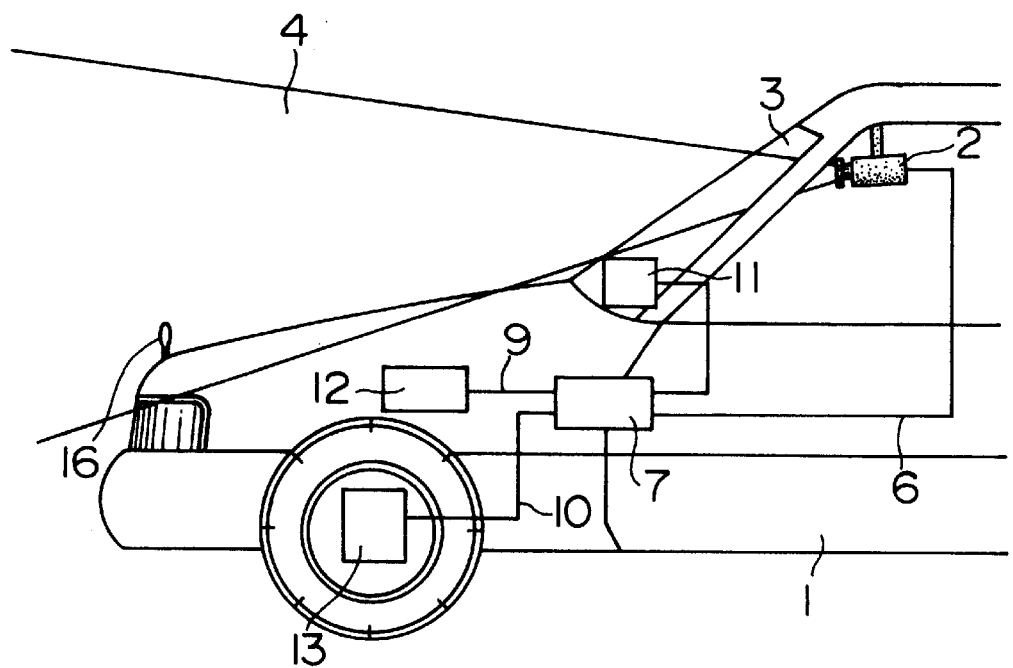
FIG. 5 is a schematic side view showing a structure of another embodiment of the present invention.
Figure 6:
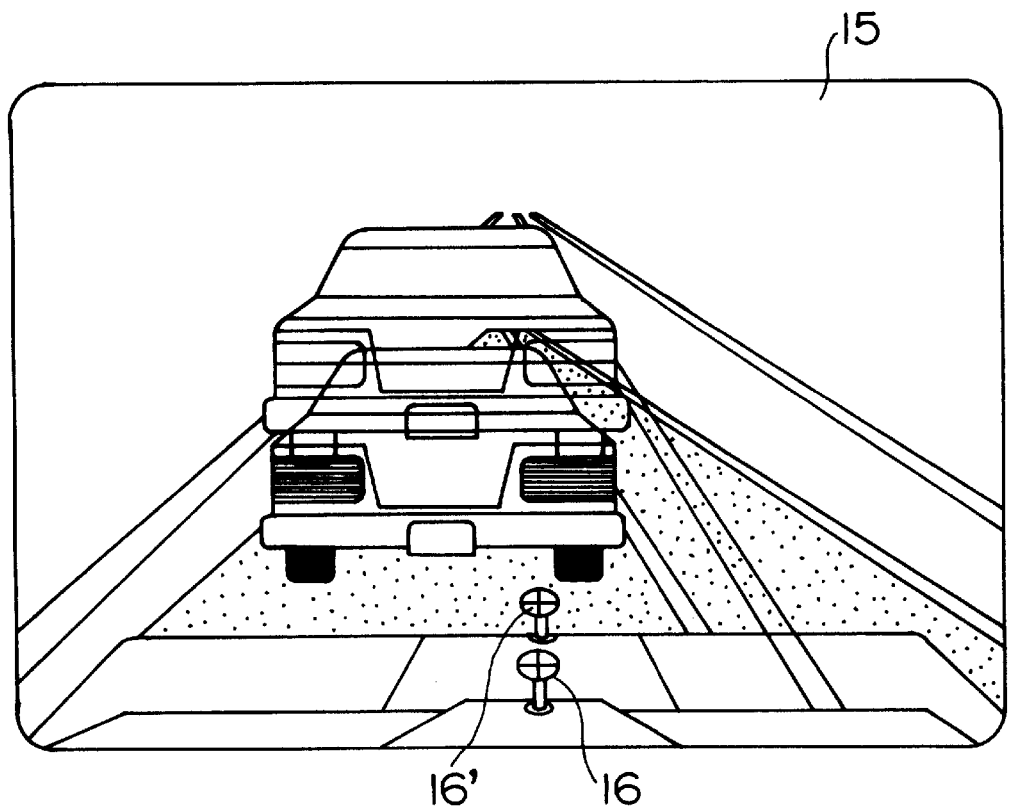
FIG. 6 is an image window showing the operation of the other embodiment.

Next, a second embodiment of the present invention will be described with reference to FIG. 5 and FIG. 6. In the present embodiment, a bonnet mascot 16 fitted to the bonnet of its own vehicle is utilized in place of the mark 5 stuck to the windshield 3 in the first embodiment. In the present embodiment, the image sensor 2 is installed so that the bonnet mascot 16 is located within an image pickup area 4 thereof, and the initialized location and a detected location 16' during running of the bonnet mascot 16 within the image window such as shown in FIG. 6 are compared sequentially with each other, thereby to monitor and decide the location change of the image sensor. In the structure and the operation, the mark 5 is only replaced with the bonnet mascot 16 with respect to the first embodiment shown in FIG. 1 to FIG. 3, and entirely similar effects as the first embodiment are obtainable. Furthermore, since the operation for sticking the mark 5 later becomes unnecessary in the present embodiment, it is possible to reduce mandays as compared with the first embodiment.

The bonnet mascot fitted to the bonnet of its own vehicle has been utilized in the present embodiment, but it is a matter of course that similar effects are obtainable when any of a part of the bonnet, an automobile inspection seal pasted to the windshield, a part of ceiling or the like that is fixed to its own vehicle is used in place of the bonnet mascot.

Figure 7:
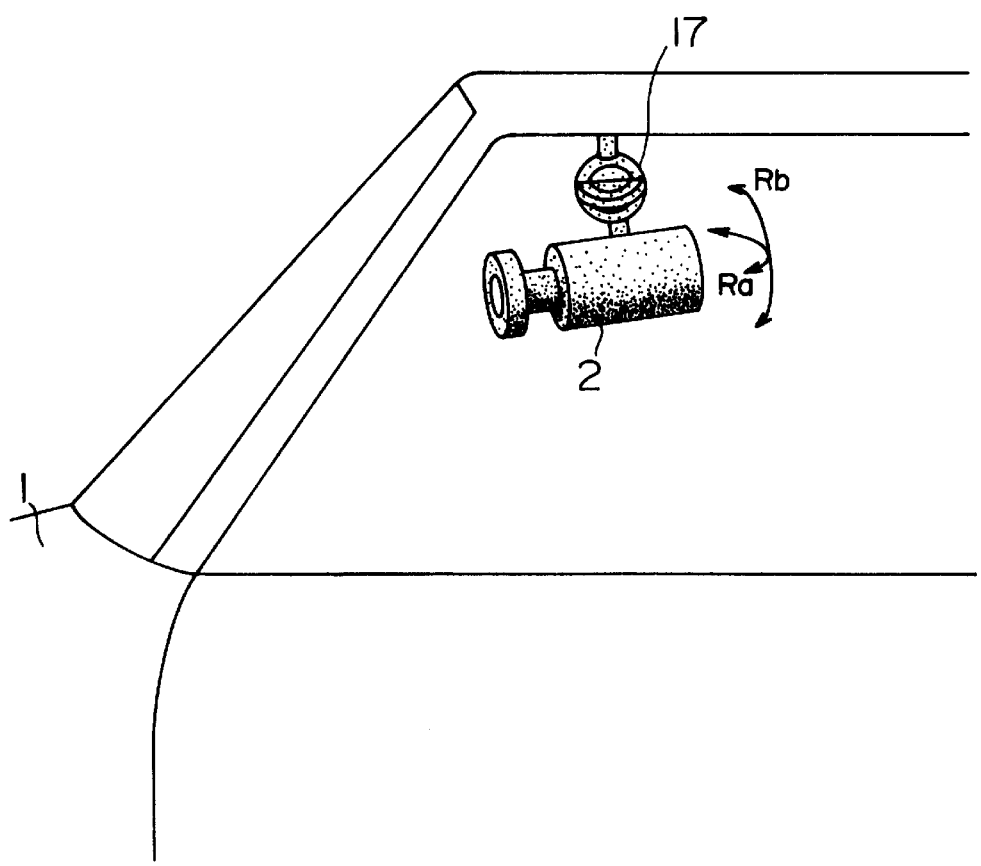
FIG. 7 is a schematic side view showing still another embodiment of the present invention.
Figure 8:
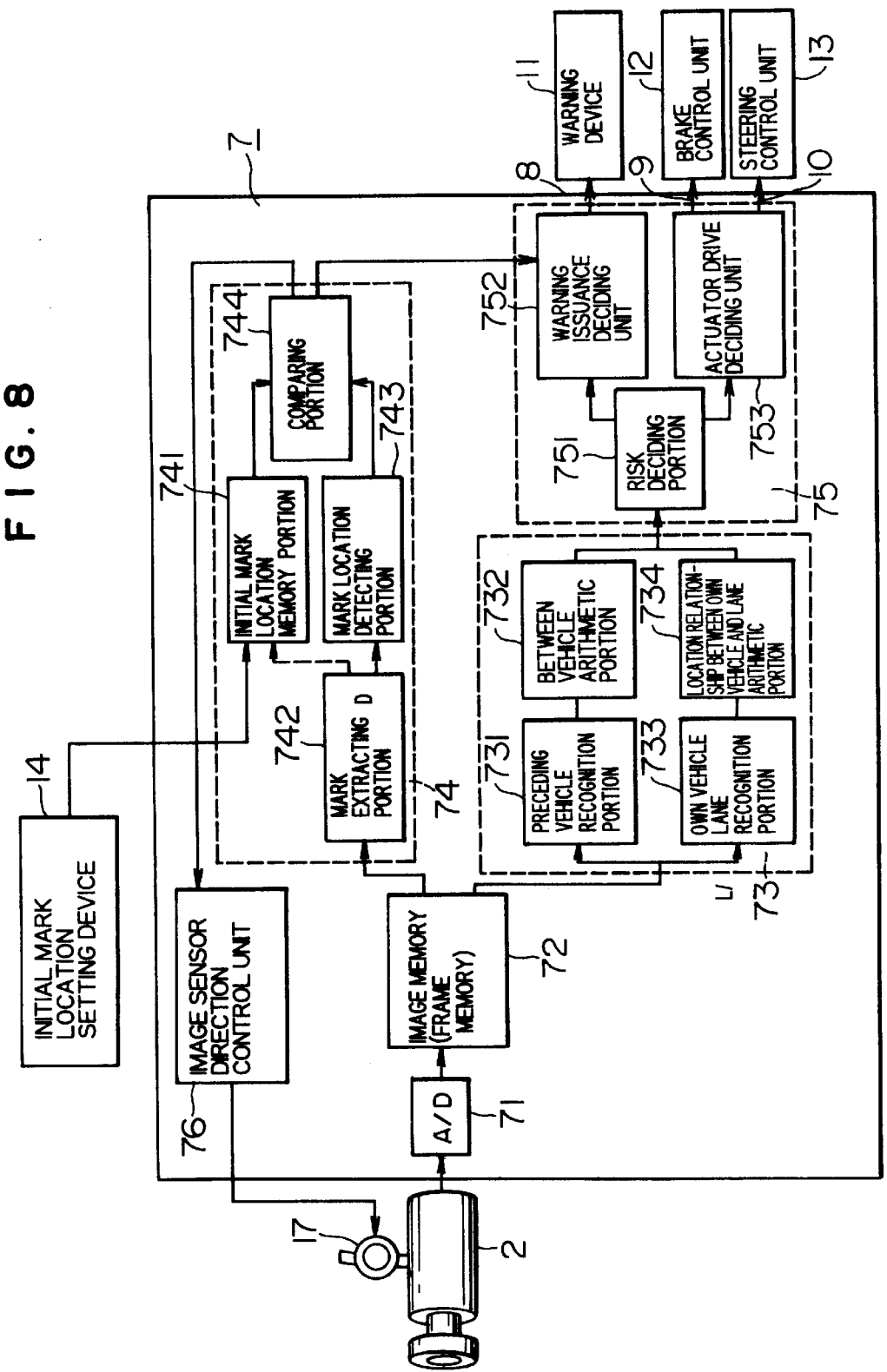
FIG. 8 is a block diagram showing a structure of a signal processing portion of the embodiment shown in FIG. 7.

Next, a third embodiment of the present invention will be described with reference to FIG. 7 to FIG. 10. What differs from the first embodiment in the structure of the present embodiment is a fact that the image sensor 2 is fitted to its own vehicle 1 through a universal joint 17 that is able to be turned freely in a vertical direction $R_b$ and in a horizontal direction $R_a$ by means of a motor as shown in FIG. 7, and furthermore, is a fact that the comparator 744 and the joint 17 are connected through an image sensor direction control unit 76 as shown in FIG. 8.

Figure 3:
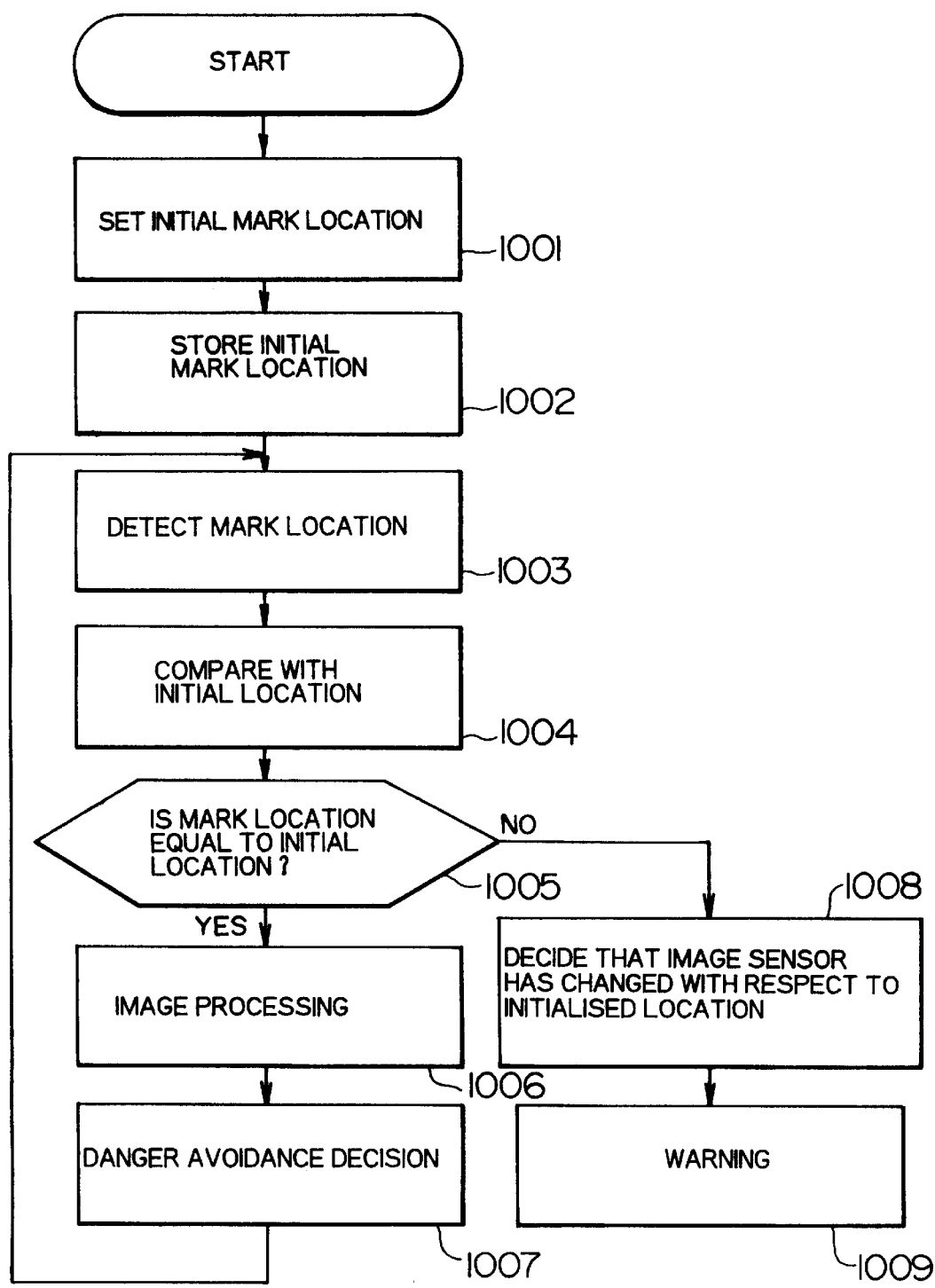
FIG. 3 is a flowchart showing a processing operation of the embodiment.
Figure 9:
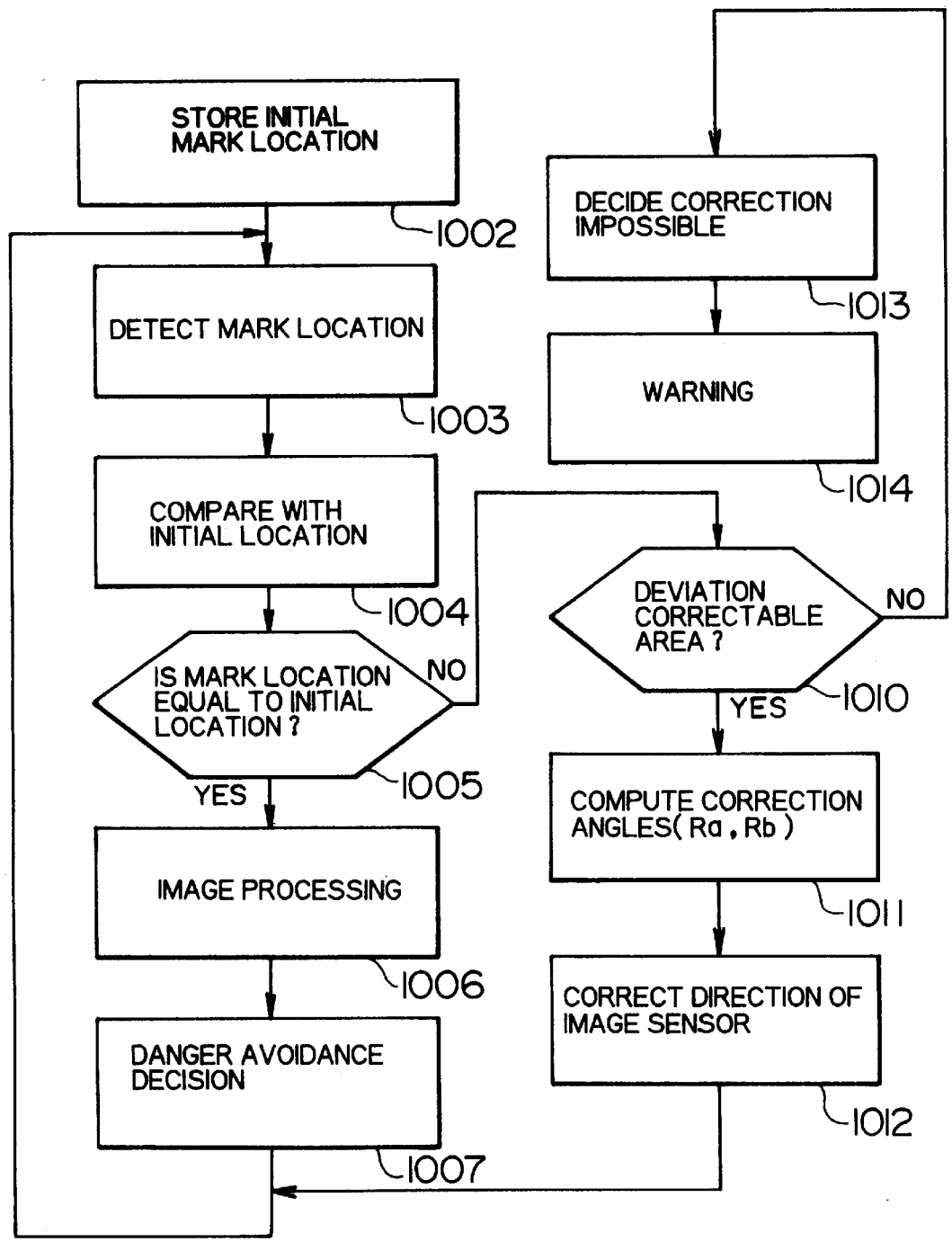
FIG. 9 is a flowchart showing signal processing operation of the embodiment shown in FIG. 7.

The operation of the present embodiment becomes similar to that of the first embodiment shown in FIG. 3 when deviation of a mark from the initial location is not detected in the comparator 744 as shown in the flow 1002 to 1007 in FIG. 9. On the other hand, when the deviation is detected (1005), it is decided in the image sensor direction control unit 76 whether the deviation quantity is correctable or not (1010). When correction is possible, it is computed in which direction and to what extent the angle of the image sensor is to be changed based on the magnitudes a and b in the horizontal direction and the vertical direction of the mark deviation quantity shown in FIG. 10 (1011), and the universal joint 17 is driven by the motor, thereby to correct so that the mark location 5' coincides with the initial location 5 (1012). However, when it is decided in the processing 1010 that the required correction quantity in the image sensor direction is out of the movable range of the joint 17 (1013), a warning is given to the driver through the warning issuance deciding unit 752 and the warning device 11 (1014).

In the present embodiment, when deviation of the image sensor is produced, it is corrected automatically on the side of the device. Therefore, an effect that the driver is released from readjustment work is obtainable in addition to the effect of the first embodiment.

Next, a fourth embodiment of the present invention will be described with reference to FIG. 11. The present embodiment is similar to the third embodiment in that the direction of the image sensor is corrected automatically, but differs therefrom in a point that only an image pickup portion 210 consisting of a lens 201 and a CCD element 202 is driven by means of a motor contained in the image sensor 2 without changing the direction of the whole image sensor by means of the joint 17.

In the present embodiment, since the weight of the driving portion is reduced substantially, the response speed of the image pickup system to a correction signal is improved and the safety is improved further in addition to the effect of the third embodiment.

Figure 12:
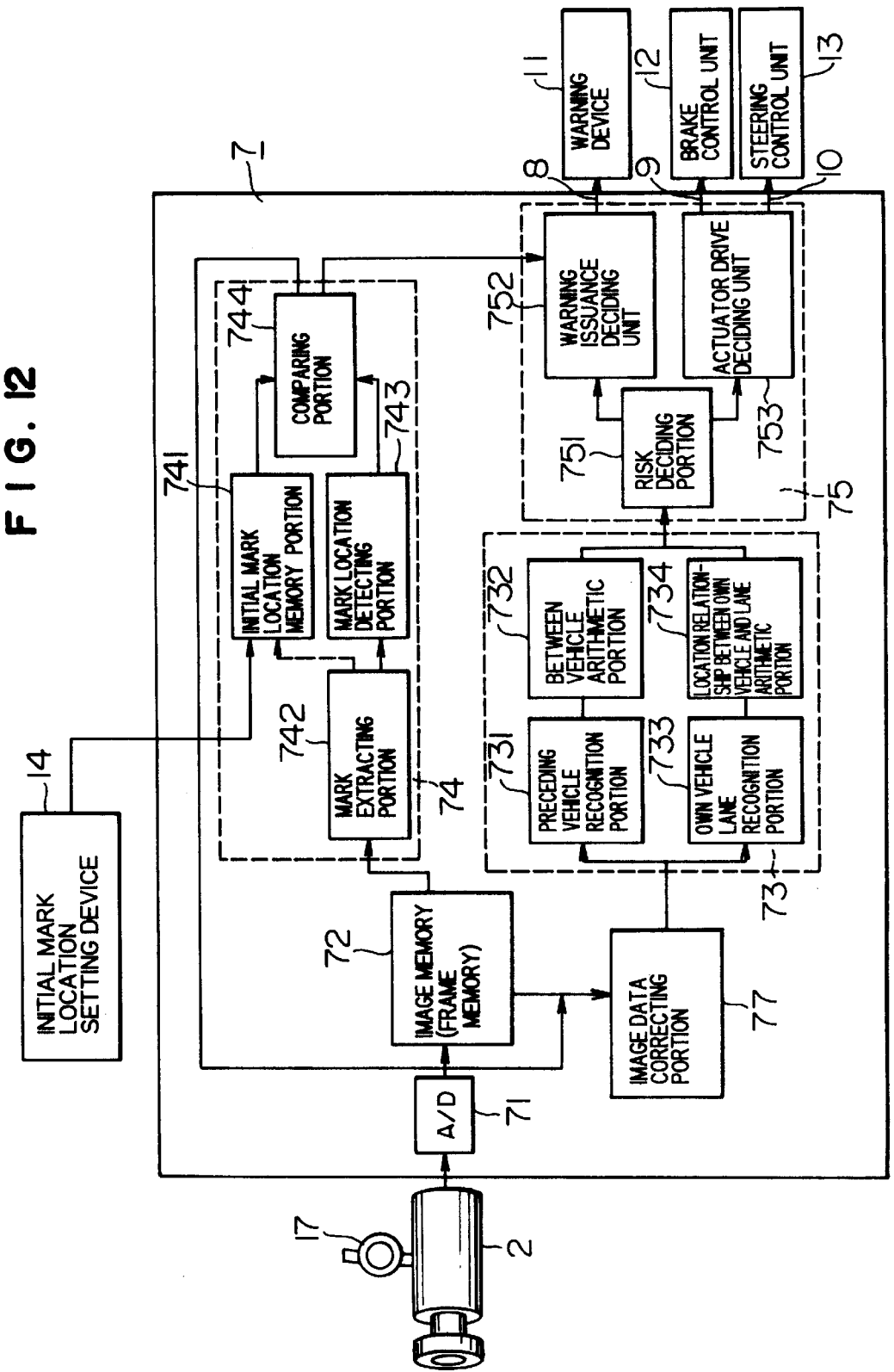
FIG. 12 is a block diagram showing a signal processing portion of still another embodiment of the present invention.

Next, a fifth embodiment of the present invention will be described with reference to FIG. 10, FIG. 12 and FIG. 13. What differs from the first embodiment in point of the structure of the present embodiment is the fact that an image data correcting portion 77 for performing correction and storage of data is provided between the image memory 72 and the image processing portion 73 as shown in FIG. 12, thereby to feed back the result of the comparator 744 to the image data correcting portion 77.

Figure 13:
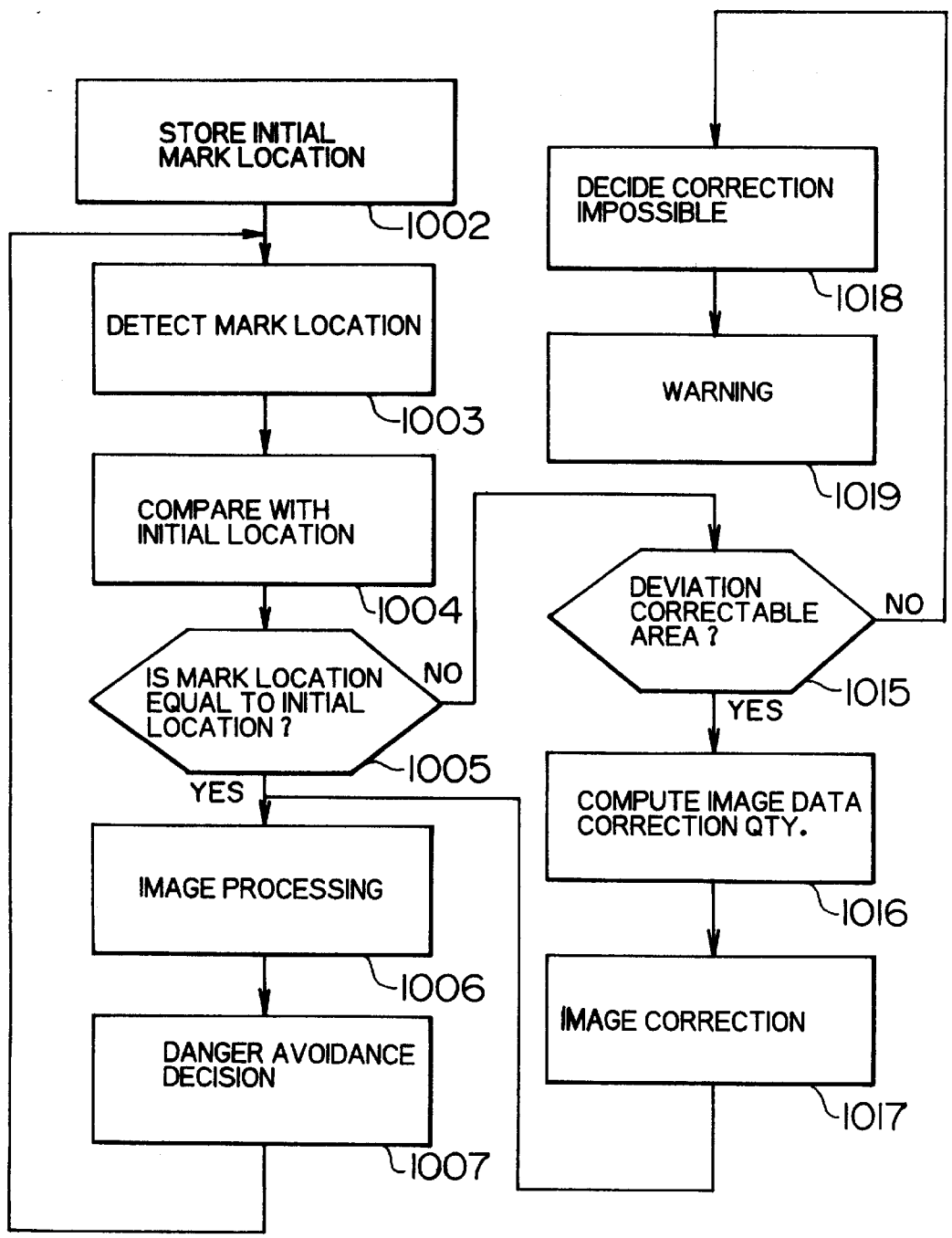
FIG. 13 is a flowchart showing a signal processing operation of the embodiment shown in FIG. 12.

The operation of the present embodiment becomes similar to that in the first embodiment shown in FIG. 3 when deviation of the mark with respect to the initial location is not detected in the comparator 744 as shown in the flow from 1002 to 1007 in FIG. 13. On the other hand, when deviation is detected (1005), it is decided in the image correcting portion 77 whether the deviation quantity is correctable in the image window or not (1015). When correction is possible, it is computed in which direction and to what extent the image data are to be changed based on the magnitudes a and b in a horizontal direction and a vertical direction of mark deviation quantities a and b shown in FIG. 10 (1016), and the image data are corrected based on the computed quantities (1017). For example, as a simple correction method, there is a method of adding to or subtracting from all the data in the field of view vertically or horizontally by the pixel portion that the mark is deviated. Thereafter, the processings thereafter (1006, 1007) are performed using corrected data. When it is decided in the process 1015 that the required correction quantity of the image data is out of the movable range in the image window (1018), however, a warning is given to a driver through the warning issuance deciding unit 752 and the warning device 11 (1019).

In the present embodiment, similar effects as those in the third and the fourth embodiments are obtainable, but a mechanism for rotating the image sensor becomes no longer required, thus producing an effect that weight and cost are reduced and reliability is also improved remarkably in addition to the above.

Figure 14:
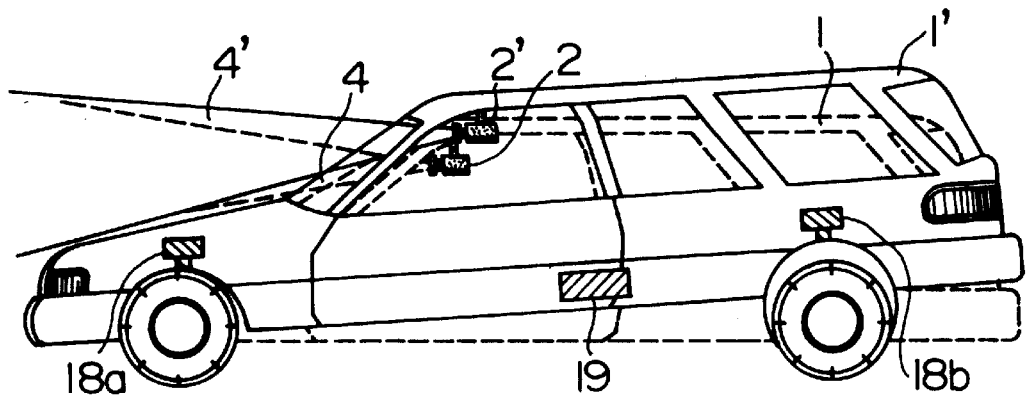
FIG. 14 is a schematic perspective view showing still another embodiment of the present invention.
Figure 15A:
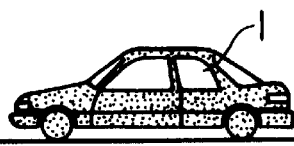
FIGS. 15A and 15B show general views for explaining the operation of the embodiment shown in FIG. 14.
Figure 15B:
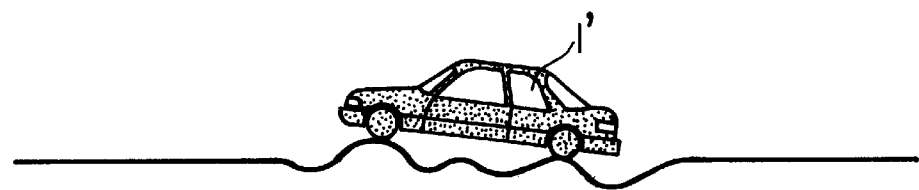

Next, a sixth embodiment will be described with reference to FIG. 14 and FIGS. 15A and 15B. In FIG. 14, a state 1' in which a vehicle jams on the brakes is drawn one over the other by comparing with a normal running state 1, but an image sensor 2' installed in vehicle is changed with respect to a normal position 2 in this state. Further, a posture change of this kind is also produced in running a bad road such as shown in FIG. 15B. As a result, the image pickup area also changes from 4 to 4', and the relative relationship between a location of a running vehicle and a practical distance between vehicles in the image window changes, thus causing erroneous judgement on the risk. In the present embodiment, the posture change of a vehicle is detected based on the information of height sensors 18a and 18b, an accelerometer 19 or the like arranged in front and in the rear of the vehicle. When a posture change is detected, it is decided that there is a possibility of erroneous judgement on the risk, and the transmission of an image signal from the image memory 72 to the image processing portion 73 in the image signal processing unit 7 shown in FIG. 2 is suspended. Then, when such a state is calmed down and the posture change is also calmed down, the image signal transmission from the image memory 72 to the image processing portion 73 is restarted.

In the present embodiment, being different from those embodiments that have been described so far, it is possible to prevent occurrence of erroneous decision on the risk that could occur even when the direction of the image sensor does not change with respect to initialization.

According to the present invention, an image pickup device has been installed so that a mark for specifying a mounting location of the image pickup device falls within the image pickup area as described in detail above. Thus, it is possible, even when a recognition location of the image pickup device changes as time elapses with respect to the initialized location, to prevent erroneous decision of the image processing unit based on the change. To be concrete, in an environment recognition device for a vehicle, it is possible to give a proper decision on a distance between vehicles for instance by providing means for recognizing and comparing mark locations picked up sequentially by an image pickup device with respect to the initial location of the mark in an image pickup area, and by informing by an alarm or the like a driver that the installation location of the image pickup device is inappropriate and required to be corrected, correcting the mounting location of the image pickup device automatically or correcting image data when the mark locations recognized sequentially change with respect to the initialized location.

What is claimed is:

1. An environment recognition device for use in a vehicle, said device comprising:

an image pickup device, mounted within an interior of said vehicle, for recognizing an environment confronted by said vehicle by signal processing of image pickup data;

a storage unit for storing a reference frame including an image of an initial location of a reference mark fixed to said vehicle and lying within a field of view of said image pickup device; and a comparator for comparing the reference frame including the image of the initial location of said reference mark with at least one subsequent image of said image pickup device to check for deviation in aiming of said image pickup device.

2. A device according to claim 1, wherein said reference mark is one of a mark fixed at a predetermined location on a windshield of said vehicle and a hood ornament.

3. A vehicle comprising:

an image pickup device, mounted within an interior of said vehicle, for obtaining peripheral environmental information as image data of an environment confronted by said vehicle;

a reference mark fixed to said vehicle and lying within a field of view of said image pickup device;

a storage unit for storing a reference frame including an image of an initial location of said reference mark; and a comparator for comparing said reference frame including the image of the initial location of said reference mark with at least one subsequent image of said image pickup device to check for deviation in aiming of said image pickup device.

4. An image pickup device for a vehicle for outputting environmental information inside and outside said vehicle as image data, said device comprising:

a storage unit for storing a reference frame including an image of an initial location of a reference mark fixed to said vehicle and lying within a field of view of said image pickup device; and a comparator for comparing said reference frame including the image of the initial location of said reference mark with at least one subsequent image of said image pickup device to check for deviation in aiming of said image pickup device.

5. A method of recognizing an environment confronting a vehicle from image pickup data, by image processing of image pickup data picked up by an image pickup device fixed to said vehicle, said method comprising the steps of:

fixing a reference mark on said vehicles, and said reference mark lying within a field of view of said image pickup device;

storing, in a storage unit, a reference frame of an image of an initial location of said reference mark; and comparing said reference frame including the image of the initial location of said reference mark with at least one subsequent image of said image pickup device to check for deviation in aiming of said image pickup device.

6. A method according to claim 5, wherein said reference mark is one of a hood ornament and a mark fixed to a predetermined location on a windshield of said vehicle.

7. An environment recognition device for a vehicle comprising:

an image pickup apparatus having an image pickup device installed in said vehicle for picking up an image of an exterior environment confronting said vehicle;

an image processing apparatus for deciding existence of a predetermined dangerous state representing a danger to said vehicle based on image pickup data of said image pickup device;

warning means for alerting a driver when the predetermined dangerous state is recognized by said image processing apparatus;

a reference mark provided at a fixed position on said vehicle within an image pickup area of said image pickup device, a memory for storing a reference frame including a reference image of said image pickup device, said reference image containing an initial location of said reference mark; and a detecting apparatus for detecting a location of the reference mark within at least one subsequent image of said image pickup device, and a comparator apparatus for comparing said reference frame including the reference image with said at least one subsequent image and for alerting a driver through said warning means when the reference mark location in said at least one subsequent image has changed with respect to the initial location of said reference mark in the reference image of the reference frame stored in said memory.

8. A device according to claim 7, wherein said memory for storing said initial location of said reference mark is a read-only memory.

9. A device according to claim 7, wherein said memory for storing said initial location of said reference mark is a random access memory having a back-up power source so that said memory is not erased even when an engine is stopped.

10. An environment recognition device for a vehicle comprising:

an image pickup apparatus having an image pickup device installed in said vehicle for picking up an image of an exterior environment confronting said vehicle;

an image processing apparatus for deciding existence of a predetermined dangerous state representing a danger to said vehicle by using image pickup data of said image pickup device;

warning means for alerting a driver when the predetermined dangerous state is recognized by said image processing apparatus;

a reference mark provided at a fixed position on said vehicle within an image pickup area of said image pickup device;

a memory for storing a reference frame including a reference image of said image pickup device, said reference image containing an initial location of said reference mark; and a detecting apparatus for detecting locations of the reference mark location within subsequent images of said image pickup device, said image pickup device continuing to transmit an image signal to said image processing apparatus until said detecting apparatus detects a deviation of one of said reference mark locations in said subsequent images from the initial location of said reference mark in the reference image of said reference frame.

11. An environment recognition device for a vehicle comprising:

an image pickup apparatus having an image pickup device installed in said vehicle for picking up an image of an exterior environment confronting said vehicle;

an image processing apparatus for deciding existence of a predetermined dangerous state representing a danger to said vehicle by using image pickup data of said image pickup device;

warning means for alerting a driver when the predetermined dangerous state is recognized by said image processing apparatus;

a reference mark provided at a fixed position on said vehicle within an image pickup area of said image pickup device;

a memory for storing a reference frame including a reference image of said image pickup device, said reference image containing an initial location of said reference mark; and a detecting apparatus for detecting a location of the reference mark within at least one subsequent image of said image pickup device, and for suspending an image signal transmission from said image pickup device to said image processing apparatus when the reference mark location in said at least one subseruent-image has changed with respect to the initial location of said reference mark in the reference image of said reference frame.

12. An environment recognition device for a vehicle comprising:

posture change sensors for sensing a posture change of said vehicle;

an image pickup device installed in said vehicle for picking up an image of an exterior environment confronting said vehicle;

an image processing apparatus for deciding existence of a predetermined dangerous state resenting a danger to said vehicle using image data of said image pickup device;

alerting means for alerting a driver when the predetermined dangerous state is recognized by said image processing apparatus;

a reference mark provided at a fixed position on said vehicle within an image pickup area of aid image pickup device;

a storage device for storing a reference frame including an initial image including said reference mark;

a comparator for comparing the reference frame including the initial image with subsequent images of said image pickup device to check for deviation in aiming of said image pickup device; and a suspending apparatus for suspending an image signal transmission from said image pickup device to said image processing apparatus when a posture change of said vehicle is sensed by said posture change sensors.

13. A device according to claim 12, wherein said posture change of said vehicle is sensed by outputs of at least one height sensor provided on a suspension.

14. A device according to claim 12, wherein said posture change of said vehicle is sensed by an output of an accelerometer fitted on a vehicle body.

15. An environment recognition device for a vehicle comprising:

an image pickup apparatus having an image pickup device installed in said vehicle for picking up an image of a fixed portion of said vehicle and an exterior environment confronting said vehicle;

an image processing apparatus for deciding existence of a predetermined dangerous state representing a danger to said vehicle by using image pickup data of said image pickup device, and warning means for alerting a driver when the predetermined dangerous state is recognized by said image processing apparatus;

a reference mark provided fixed to said fixed portion of said vehicle within an image pickup area of said image pickup device;

a memory for storing a reference frame including a reference image containing an initial location of said reference mark on said fixed portion of said vehicle; and a detecting apparatus for detecting a reference mark location and a fixed portion of said vehicle within at least one subsequent image of said image pickup device, or comparing the location of said reference mark and the fixed portion of the vehicle in said at least subsequent image with the initial location of said reference mark in the reference image of said reference frame, and for alerting a driver through said warning means when the location of said reference mark location and the fixed portion of the vehicle in said at least one subsequent image has changed with respect to die initial location of said reference mark in the reference image of said reference frame.

16. A device according to claim 15, wherein said fixed portion of said vehicle is more specifically a hood in front of a windshield.

17. A device according to claim 15, wherein said reference mark is more specifically a mark stuck on a windshield.

18. A device according to claim 15, wherein said fixed portion of said vehicle is more specifically a trunk hood in a rear windshield.

19. An environment recognition device for a vehicle comprising:
- an image pickup apparatus having an image pickup device installed in said vehicle for picking up an image of an exterior environment confronting said vehicle;
- an image processing apparatus for deciding existence of a predetermined dangerous state representing a danger to said vehicle by using image pickup data of said image pickup device;
- warning means for alerting a driver when said predetermined dangerous state is recognized by said image processing apparatus;
- a reference mark provided fixed to said vehicle within an image pickup area of said image pickup device, said reference mark serving as a basis for checking deviation in aiming of said bray pickup device;
- a memory for storing a reference frame including a reference image of said image pickup device, said reference image containing an initial location of said reference mark; and
- an aiming apparatus for detecting a location of the reference mark within at least one subsequent image of said image pickup device, for comparing the location of the reference mark within said at least one subsequent image with the initial location of said reference mark in the reference image of said reference frame, and when said reference mark location in said at least one subsequent image his changed with respect to the initial location of s id reference mark in the reference image of said reference frame, for automatically adjusting an aiming direction of said image pickup device so that said reference mark location in sail at least one subsequent image and images thereafter coincide with the in trial location of said reference mark in the reference image of said reference frame.

20. A device according to claim 19, wherein the adjusting of aiming direction of the image pickup device is made by a motor.

21. A device according to claim 19, wherein the adjusting of aiming direction of the image pickup device is made by a change in an image pickup system composed of a lens and a charge coupled device element.

22. An environment recognition device for a vehicle comprising:
- an image pickup apparatus having an image pickup device installed in said vehicle for picking an image of an exterior environment confronting said vehicle;
- an image processing apparatus for deciding existence of a predetermined dangerous state representing a danger to said vehicle by using image pickup data of said image pickup device;
- warning means for alerting a driver, when said predetermined dangerous state is recognized by said image processing means;
- a reference mart provided fixed to said vehicle within an image pickup area of said image pickup device;
- a memory for storing a reference frame including a reference image of said image pickup device, said reference image containing an initial location of said reference mark; and
- an aiming apparatus for detecting a location of the reference mark within at least one subsequent page of said image pickup device, for comparing the location of the reference mark within said at least one subsequent image with the initial location of said reference mark in the reference image of said reference frame, and when said reference mark location n in said at least one subsequent image has changed with respect to the initial location of aid reference mark in the reference image of said reference frame, for correcting image data taken into said image processing apparatus in accordance with a quantity and a direction of the change.

23. A device according to any one of claims 1, 3, 4, 5, 7, 10, 11, 12, 19, and 22, wherein said reference mark is one of a mark fixed at a predetermined location on a windshield of said vehicle and a hood ornament.

24. An environment recognition device for a vehicle, comprising:
- an image pickup device, mounted within said vehicle, for recognizing an environment confronted by said vehicle by signal processing of image pickup data;
- a storage unit for storing a reference frame including a reference, image indicative of an initial location of a reference mark fixed to said vehicle and lying within field of view of said image pickup device; and
- a comparator for comparing said reference frame including the reference image indicative of the initial location of said reference mark with at least one subsequent image from said image pickup device to check for deviation in aiming of said image pickup device.

25. A device according to claim 24, wherein said reference mark is one of a mark fixed at a predetermined location on a windshield of said vehicle and a hood ornament.

* * * * *